Feb. 1, 1966
C. W. BERGMAN
TILLERS OR POWER DRIVEN EARTH
WORKING TILLERS AND GARDEN
TRACTORS AND THE LIKE
3,232,352
Filed April 14, 1964
4 Sheets-Sheet 1
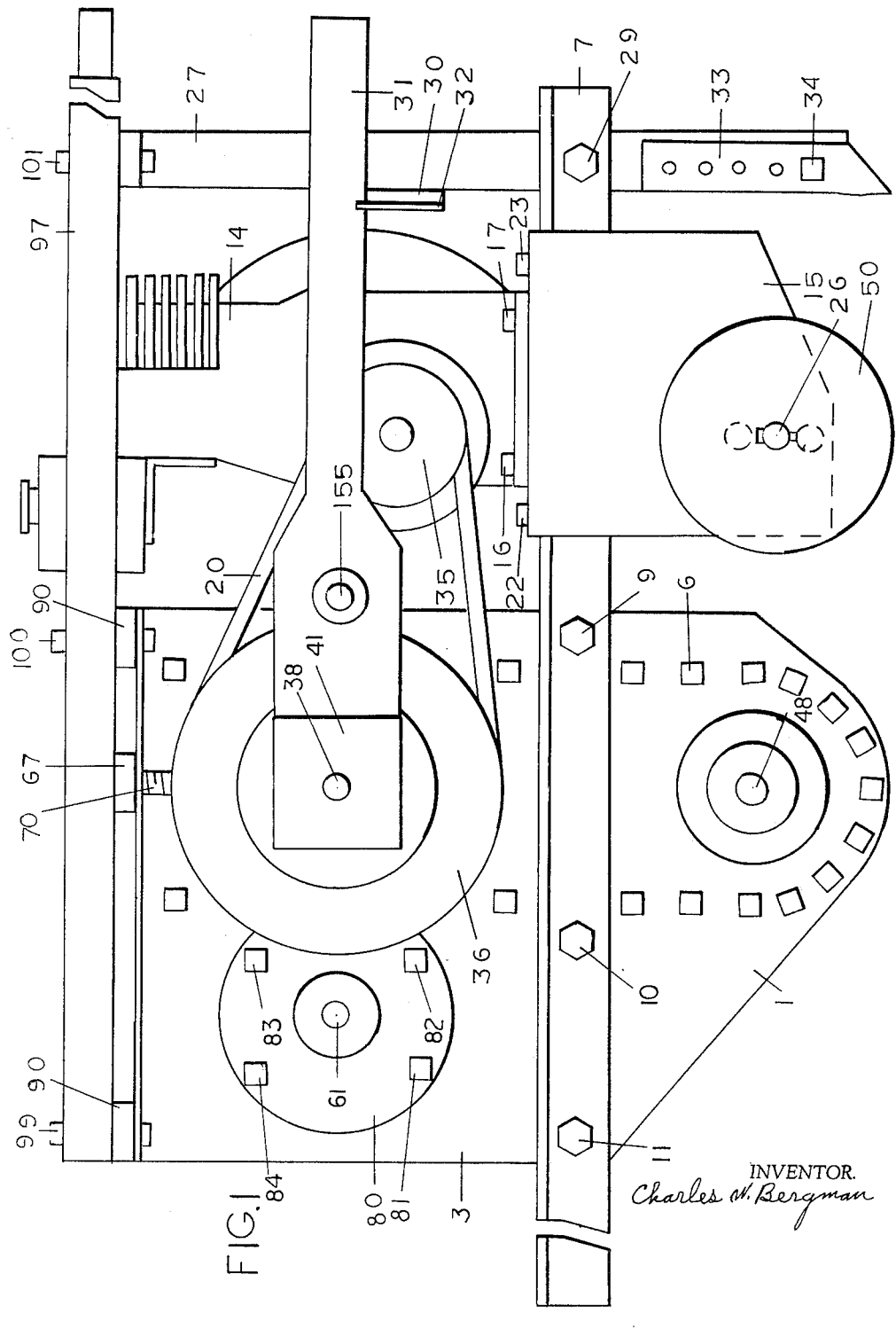
INVENTOR.
Charles W. Bergman Feb. 1, 1966

C. W. BERGMAN 3,232,352

TILLERS OR POWER DRIVEN EARTH
WORKING TILLERS AND GARDEN
TRACTORS AND THE LIKE

Filed April 14, 1964

INVENTOR.
Charles W. Bergman
BY

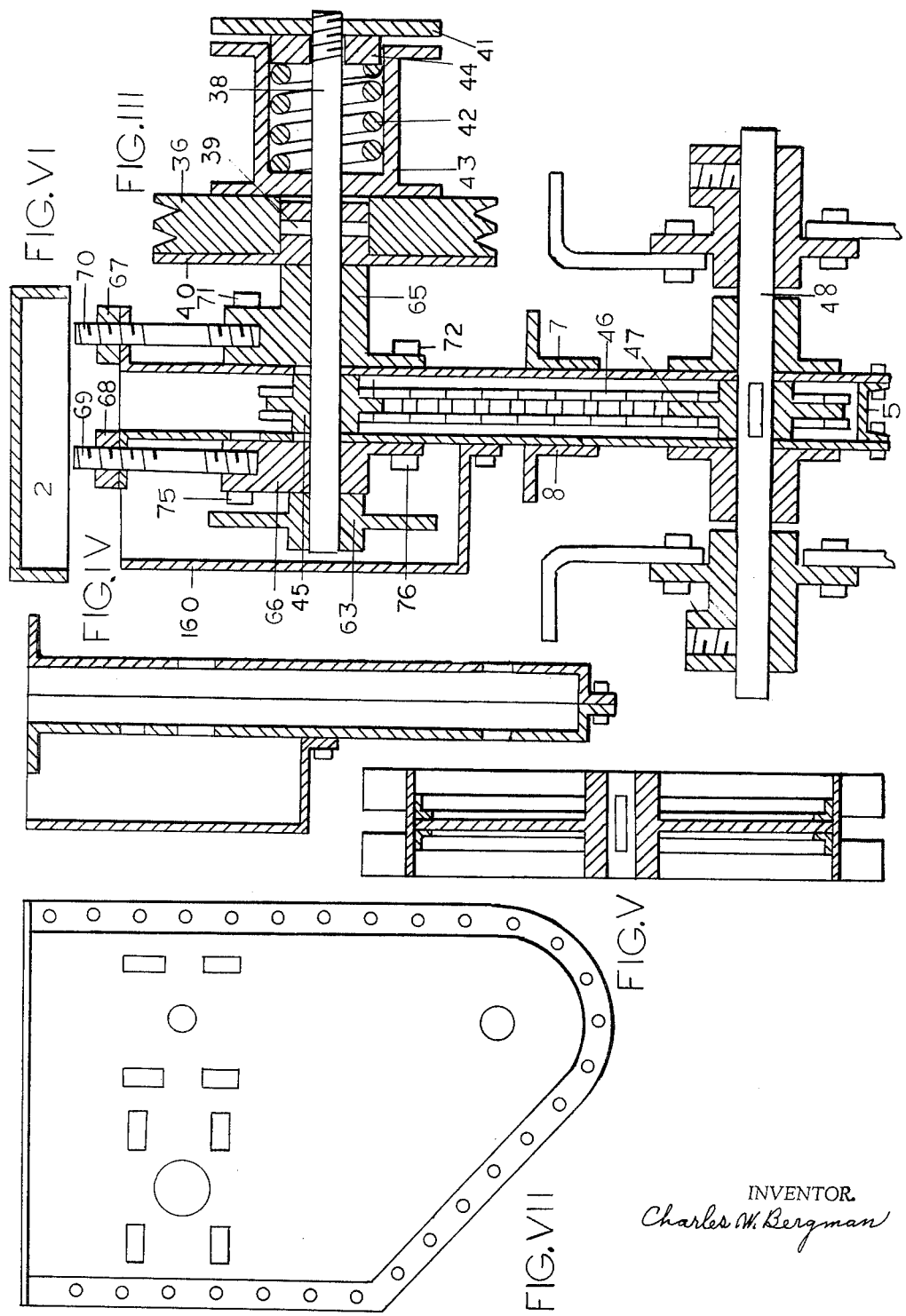

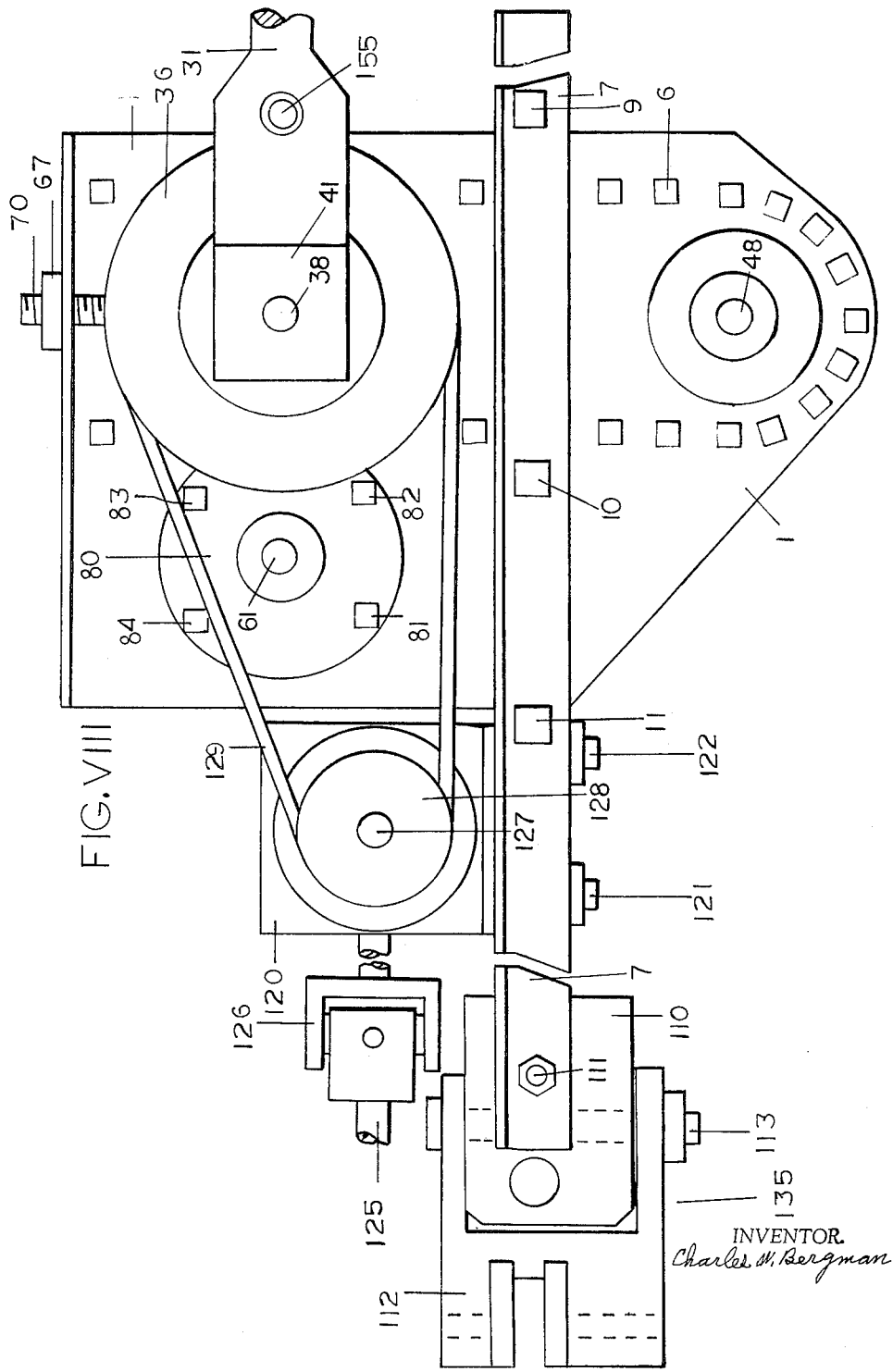

United States Patent Office 3,232,352
Patented Feb. 1, 1966

3,232,352
TILLERS OR POWER DRIVEN EARTH WORKING TILLERS AND GARDEN TRACTORS AND THE LIKE
Charles W. Bergman, R.R. 2, Grand Rapids, Mich.
Filed Apr. 14, 1964, Ser. No. 359,751
1 Claim. (Cl. 172—42)

This invention relates to power driven earth working tillers and tractors and the like that have their own power units and to tillers without power units which can be attached to a tractor or the like as a trailing tiller and receive power from the tractor or the like and more particularly to an improved transmission chain drive housing for transmitting power therein.

Other chain drive tillers and tractors have these and other faults:

(1) There is no way or means for the operator to see or know quickly how much, if any, oil is in chain drive housing or to see if chain is too loose or worn too much.

(2) There is no way in other tillers and tractors and the like to remove worn chain or chains and sprockets from chain drive housing or to put in new chain or chains and sprockets without taking transmission chain drive housing apart.

(3) There is no way or means to adjust chain or chain tension or to tighten chain or chains when chains wear and become elongated or stretched.

(4) There is no safety release clutch to prevent damage or breakage to the mechanical parts when a solid obstruction is encountered.

One object of this invention is to provide an improved power transmission chain drive housing, with an open top, and power transmission means for earth working tillers and tractors and the like in which the operator can—

(1) See quickly if there is enough oil in chain drive housing wherein the chain, sprockets and bearings run.

(2) Through the open top of the power transmission chain drive housing see and feel quickly if the chains are adjusted to the proper working tension or if chain is worn enough to need replacement.

(3) Through open top of chain drive housing connecting link in chain can be removed and worn chains and sprockets can be removed and new chain and sprockets be put into chain drive housing through the open top of housing without taking chain drive housing apart.

Another object of this invention is to provide means in top end of drive housing to adjust tension of chains.

Another object of this invention is to provide an improved earth working tiller without a power unit of its own which can be attached to a tractor or the like as a trailer and receive the power to drive the tilling blades from the tractor to which tiller is attached.

Another object of this invention is to provide a friction clutch that acts as a starting clutch and a safety release clutch which prevents damage to or breakage to the machine parts when an obstruction is hit.

Another object of this invention is to provide an earth working tiller and tractor which may be converted to either by interchanging some of its parts.

This invention has other objects and features of advantage some of which, with the foregoing, will be set forth in the following description of the preferred form of the invention which is illustrated in the drawings accompanying and forming part of the specifications.

It is to be understood however, that variations in the showing made by said drawings and descriptions may be adapted within the scope of the invention as set forth in the claims.

These and other objects and advantages of the present invention will become apparent from the following description and the drawings in which:

FIG. 1 is a side elevation of one embodiment of the earth working tiller and tractor of the present invention.

FIG. 2 is a top plan view of the tiller and tractor shown in FIG. 1.

FIG. 3 is a cross sectional view of the transmission chain drive housing from top to bottom through the center of sprockets in rear part of said drive housing and through center of clutch.

FIG. 4 is a cross sectional view of the transmission chain drive housing when made up of two case halves each peripherally flanged and shallow dished with the flanges bolted together.

FIG. 5 is a cross sectional view of a tractor wheel.

FIG. 6 shows a cover for top of transmission drive housing.

FIG. 7 is a side view of one-half of the transmission chain drive housing when made up of two case halves each peripherally flanged and shallow dished with the flanges bolted together.

FIG. 8 is a side view of the tiller which can be attached to a tractor or the like as a trailing tiller and receive the power needed from the tractor to turn the tilling tines of the tiller.

Figure 11:
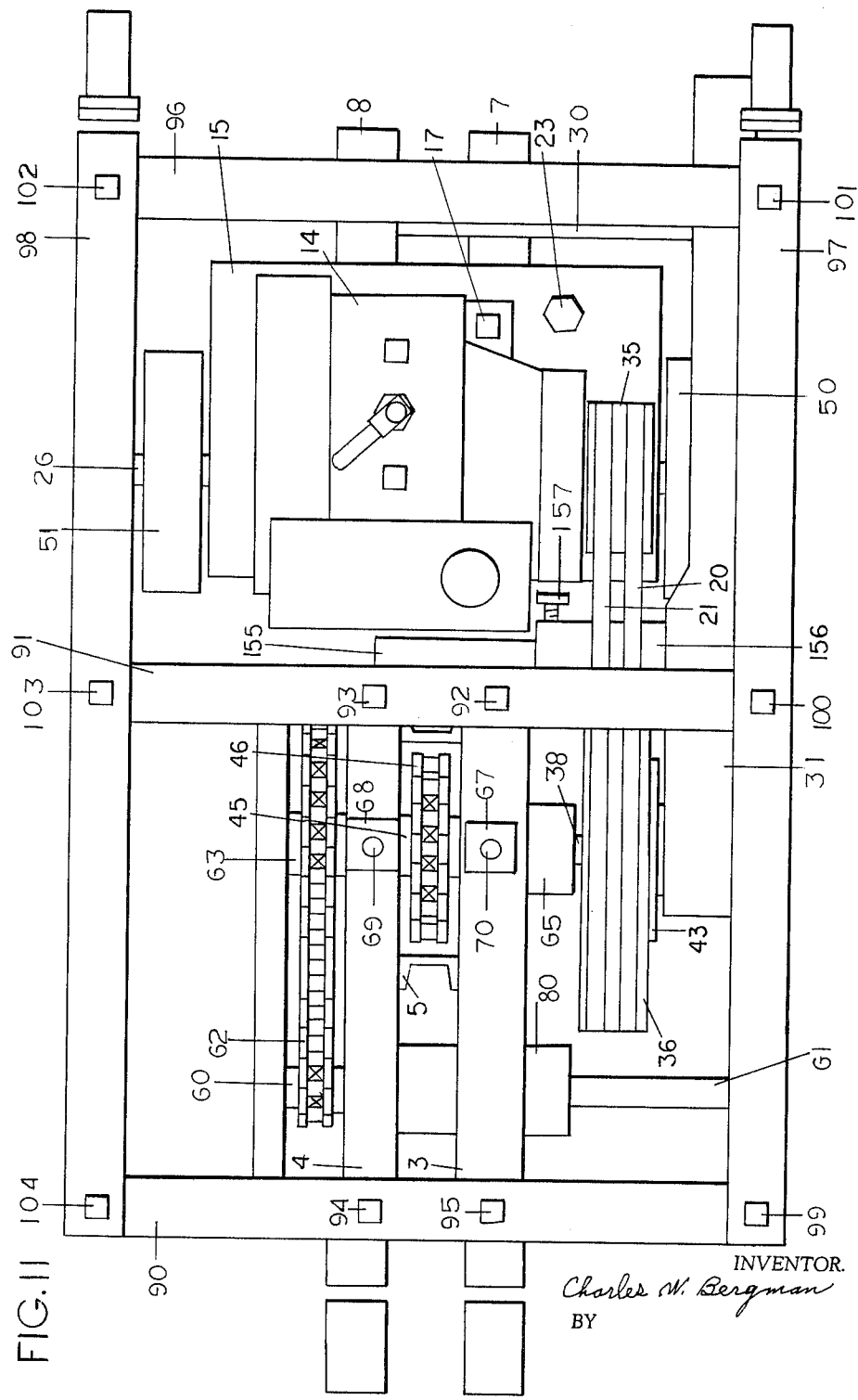

In FIGS. 1 and 2 the side view of my improved earth working tiller and tractor there is shown the rigid power transmission chain drive housing, with an open top, with the cover 2 FIG. 6 removed, which is made up of two plates 3, 4 and a standard width channel iron 5 bent to proper form and bolted together with many small bolts 6 and rigidly secured between the two longitudinal angle iron frame members 7, 8 by the three bolts 9, 10, 11. The power transmission drive housing 1 may also be made up of two case halves, with an open top, FIG. 4, each peripherally flanged and shallow dished with the flanges being bolted together without departing from the spirit of the invention. The power unit 14 FIG. 1 is a standard internal combustion engine with a six to one reduction gear built into side of engine when desired. The power unit 14 is bolted to the movable inverted U shaped piece 15 rearwardly of the chain drive housing 1 by the bolts 16, 17. The movable inverted U shaped piece 15 rests on top of the two angle iron frame members 7, 8 and is movable rearward to tighten belts 20, 21 and held rigidly in place by the bolts 22, 23. 26 is an axle shaft passing through two holes in lower ends of inverted U shaped piece 15. Two support wheels 50, 51 are mounted on ends of axle 26. 27 is a vertical frame member secured rigidly between the rear ends of the two longitudinal frame members 7, 8 by the bolt 29. 30 is a horizontal piece which supports the rear end of clutch handle 31 its inner end secured rigidly to the vertical frame member 27 its outer end having the boss 32 over which the clutch lever 31 is hooked when clutch is out of gear. Secured to the lower end of vertical frame member 27 is a brake tooth 33 demountably fastened by the bolt 34. Brake tooth 33 has several holes so it can be set at various depths.

Power is transmitted from the power unit pulley 35 by the two V belts 20, 21 to the friction clutch pulley 36. In FIG. 3, 40 is a friction clutch plate with hub keyed to the drive shaft 38 by the pin 39. The entire power of the power unit 14 is transmitted to the drive shaft 38 journal mounted in upper end and rear part of chain drive housing 1 when by turning the clutch spring 42 tension pressure adjusting nut 41 on end of thread drive shaft 38 thus forcing the movable bushing 44 against the clutch spring 42 inside the clutch yoke 43, thus forcing the friction clutch pulley 36 against clutch face plate 40 keyed to the drive shaft 38 by the pin 39. FIG. 3 shows clutch in an "IN GEAR" position. By turning the spring pressure adjusting nut to give the proper pressure to clutch spring 42 the friction clutch also acts as a safety clutch slipping when an obstruction is encountered by the tilling tines or tractor thus preventing damage to machine parts. As shown in cross sectional view in FIG. 3 of the chain, sprockets and shafts and clutch and drive housing 45 is a sprocket keyed to drive shaft 38 journal mounted in upper end and in rear part of drive housing 1. A chain 46 transmits power, at a reduced speed, from the sprocket 45 to the sprocket 47 keyed to the driven shaft 48 journal mounted in the lower end of the chain drive housing 1. An earth working assembly of tines FIG. 3 when used as a tiller and tractor wheels FIG. 5 when used as a tractor are mounted and secured on each end of drive shaft 48 in lower end of drive housing 1.

In FIG. 3 is shown an earth working assembly of tiller tines mounted on each end of drive shaft 48 in lower end of chain drive housing.

In FIG. 2 a small sprocket 60 keyed to end of drive shaft 61 just outside of top of drive housing 1 transmits power at a reduced speed through the chain 62 to the larger sprocket 63 keyed to end of drive shaft 38. Drive shaft 38 journal mounted in the upper rear end of drive housing 1 and drive shaft 61 journal mounted in upper front end of drive housing 1 are of the same dimensions so clutch and belt pulley 36 can be taken off drive shaft 38 and be put on drive shaft 61 when a slower speed is desired for the tilling tines or tractor wheels mounted on shaft 48 in lower end of drive housing 1. When the tiller or tractor is operated with the starting and safety release clutch mounted on the drive shaft 38 the chain 62 is removed from the sprockets 60 and 63. In FIG. 3, 160 is a sprocket and chain oil tight housing secured to the side of drive housing 1. In FIG. 3 the parts 65, 66 with flange and hub in which drive shaft 38 is mounted is moved upward to tighten chain in drive housing 1 with the nuts 67, 68 on studs 69, 70 and secured to side of drive housing 1 by the bolts 71, 72, 75, 76 which move in oblong holes in upper end of drive housing 1. In FIG. 1 the part 80 with flange and hub in which drive shaft 61 is mounted is moved forward to tighten chain 62 just outside of drive, housing 1 and secured to side of drive housing 1 by the bolts 81, 82, 83, 84 which move in oblong holes in top of chain drive housing 1. In FIGS. 1 and 2, 90, 91 are two cross pieces secured to the top of drive housing 1 by bolts 92, 93, 94, 95. 96 is a cross piece rigidly secured to the vertical frame member 27. Rearwardly extending handles 97, 98 secured to the cross pieces 90, 91, 96 by the bolts 99, 100, 101, 102, 103, 104 provide means for controlling the forward travel of the tiller or tractor.

In FIGURES 1 and 2 the rod 155 is rigidly secured to the rear side of the drive housing 1 and acts as the main support for the clutch lever 31. The proper position, on the rod 155 of the clutch lever 31 is obtained by adjusting the movable sleeve 156 to the proper place on the rod 155 and securing the sleeve 156 in place by the set screw 157.

In FIG. 8, 135 is a tiller to tractor hitch mounted to front end of the tiller frame with the part 110 secured between the two frame members 7, 8 by the bolt 111 which provides means for attaching the tiller to rear end of a tractor or the like when the tiller is used as a trailing tiller and receives the power needed to turn the earth working tilling tines from the tractor to which said tiller is attached. The hitch member 112 is secured to the hitch member 110 by the bolt 113 which passes through hitch member 110 thus also allowing the trailing tiller to swing to either side when tractor turns corners. The tiller to tractor hitch member 112 may be secured to a tractor, or the like, drawbar by passing a pin through the holes in hitch member 112 and through a hole in a drawbar of a tractor. A gear drive housing 120 is secured to the frame members 7, 8 by the bolts 121, 122. A propeller shaft 125 with a universal joint 126 is journal mounted in the front end of said gear drive housing 120. A drive shaft 127 is journal mounted in the left hand side of said gear housing 120. A pulley 128 is mounted on the outer end of the said drive shaft 127. Preferably bevel gears are mounted on the drive shafts inside the gear housing 120. When tiller is used as a trailing tiller power is transmitted from the tractor or the like to which tiller is attached through the propeller shaft 125 and universal joint 126 and gears in the gear housing 120 to pulley 128 at side of said gear drive housing 120. Power is transmitted from the pulley 128 by a belt 129 to the pulley 36 mounted in the friction and safety release clutch mounted on the drive shaft 38 in the upper end of the tillers power transmission chain drive housing 1.

Having thus described my invention, I claim:

A power driven earth working tiller comprising, a frame having a pair of laterally spaced longitudinal frame members having flat inside opposed faces, a narrow flat sided transmission chain drive housing rigidly secured between said pair of frame members, the upper part of the drive housing extending above said frame members, sprocket and chain drive means located within said housing, the top of said drive housing being open so that the sprocket and chain drive means can be inspected and removed, the lower end of said transmission drive housing depending below said pair of frame members, a first transversely extending shaft journaled in the lower end of said housing, a second transverse drive shaft journaled in the upper end of said housing, said sprocket and chain drive means drivingly interconnecting said shafts, a power unit mounted rearwardly of said drive housing on said pair of frame members, reduction drive means for selectively transmitting power at a reduced speed from said power unit to one end of said second shaft journaled in the upper end of the housing, a third transversely extending shaft rotatably mounted in the upper end of the housing forwardly of and parallel to said second shaft, second reduction drive means for selectively transmitting power at a reduced speed from said power unit to one end of said third shaft, the other ends of said second and third shafts extending through said drive housing, chain drive means selectively connecting the other ends of said second and third shafts, earth working tiller tines mounted on said first shaft on opposite sides of said drive housing, first adjustment means in the upper end of said drive housing for raising and lowering said second drive shaft, and second adjustment means in the upper end of said drive housing for adjusting the position of said third shaft in a horizontal direction.

References Cited by the Examiner

UNITED STATES PATENTS

| | | | |
|---|---|---|---|
| 1,795,029 | 3/1931 | Kimball | 172—103 X |
| 2,661,584 | 12/1953 | Ronning | 172—42 X |
| 2,679,794 | 6/1954 | Ober | 172—42 X |
| 2,803,183 | 8/1957 | Smithburn | 172—43 |
| 2,886,113 | 5/1959 | Sorensen et al. | 172—44 X |
| 3,072,198 | 1/1963 | Calkins et al. | 172—44 |

FOREIGN PATENTS

| | | |
|---|---|---|
| 1,060,379 | 11/1953 | France. |
| 523,154 | 4/1931 | Germany. |
| 298,119 | 10/1928 | Great Britain. |

ABRAHAM G. STONE, *Primary Examiner.*

FRANCIS B. HENRY, *Assistant Examiner.*